(12) United States Patent
Foch

(10) Patent No.: US 8,444,082 B1
(45) Date of Patent: May 21, 2013

(54) HIGH PERFORMANCE 'X'-CONFIGURATION AIRPLANE FOR STORAGE AND LAUNCH FROM A TUBULAR CONTAINER

(75) Inventor: Richard J Foch, Upper Marlboro, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 243 days.

(21) Appl. No.: 12/859,639

(22) Filed: Aug. 19, 2010

Related U.S. Application Data

(60) Provisional application No. 61/198,403, filed on Aug. 19, 2009.

(51) Int. Cl.
*B64C 3/56* (2006.01)
(52) U.S. Cl.
USPC .............................. 244/49; 244/46; 244/7 R
(58) Field of Classification Search
USPC ......................................................... 244/49
See application file for complete search history.

(56) References Cited

U.S. PATENT DOCUMENTS

| | | | |
|---|---|---|---|
| 6,170,779 B1 * | 1/2001 | Nyhus | 244/7 A |
| 6,260,798 B1 * | 7/2001 | Casiez et al. | 244/49 |
| 6,923,404 B1 * | 8/2005 | Liu et al. | 244/46 |
| 2005/0178885 A1 * | 8/2005 | Jackson | 244/49 |
| 2008/0308683 A1 * | 12/2008 | Sankrithi et al. | 244/199.4 |

* cited by examiner

*Primary Examiner* — Christopher P Ellis
*Assistant Examiner* — Medhat Badawi
(74) *Attorney, Agent, or Firm* — Amy Ressing; Sally A. Ferrett

(57) ABSTRACT

An air vehicle can be folded into or unfolded from a compact tubular storage container without assembly or disassembly of the air vehicle. The air vehicle includes a fuselage, two aerodynamic surfaces rotatably mounted on the fuselage along a common axis with at least one pivot mechanism, and at least one spring mechanism configured to deploy the aerodynamic surfaces so they extend outwardly from the body. In a stowed configuration, both aerodynamic surfaces are parallel to the fuselage for stowage of the aircraft in a container. Each aerodynamic surface has a winglet located at an outer edge of the tail portion of the aerodynamic surface, and a rudder on each winglet. The aircraft does not require a vertical stabilizer or rudder system on the fuselage. An outer backward-swept wing portion can be unfolded from the outer edge of each aerodynamic surface to increase the wing aspect ratio.

13 Claims, 5 Drawing Sheets

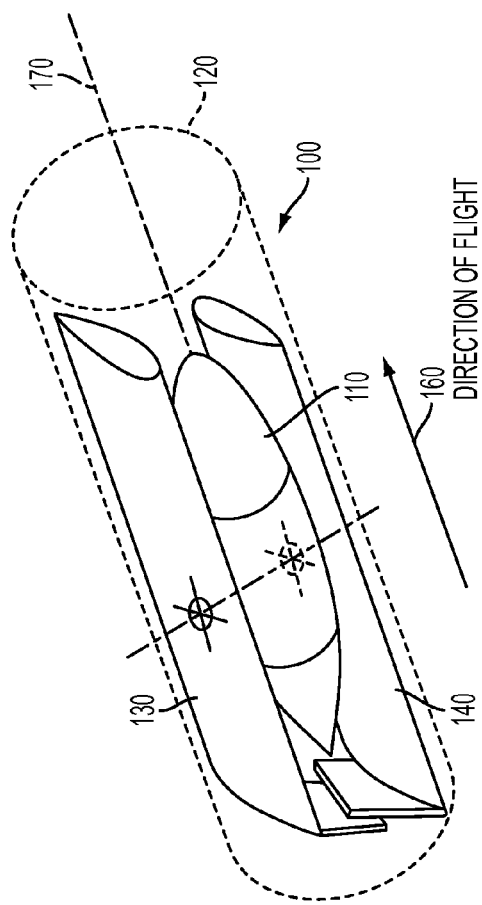
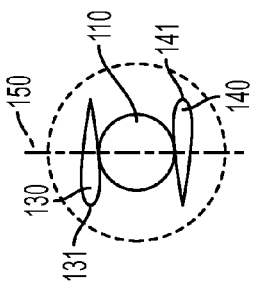
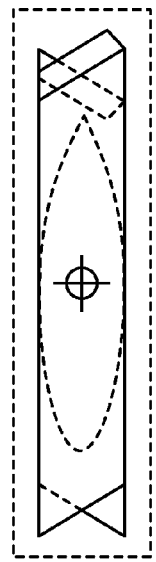
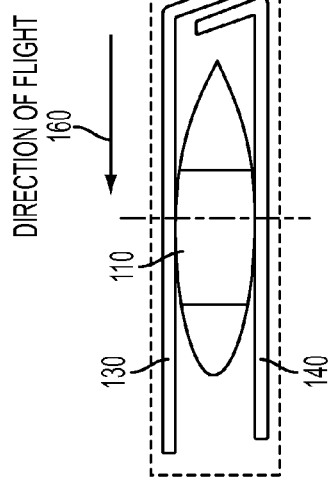
FIG. 1A
FIG. 1B
FIG. 1C
FIG. 1D

HIGH PERFORMANCE 'X'-CONFIGURATION AIRPLANE FOR STORAGE AND LAUNCH FROM A TUBULAR CONTAINER

CROSS-REFERENCE TO RELATED APPLICATIONS

This Application is a non-provisional application under 35 USC 119(d) of, and claims the benefit of, U.S. Provisional Application 61/198,403 filed on Aug. 19, 2009, the entire disclosure of which is incorporated by reference herein.

BACKGROUND OF THE INVENTION

1. Technical Field

This application is related to aircraft, and more particularly, to unmanned aircraft for being stored and launched from a storage and launch container.

2. Description of Related Technology

Storage, assembly, and launch of unmanned aircraft, particularly from aboard Naval vessels, has typically involved manual assembly of the air vehicle and placement onto a separate launch apparatus. These aircraft range in size from small hand-launchable types (e.g., Dragon-eye class) to tactical systems such as Scan Eagle and Pioneer.

Typical launchers for the larger systems are large (e.g., boat trailer sized), heavy (approximately 500-2000 lb), and complex, with either hydraulic or pneumatic cylinders to provide the launch momentum. The aircraft themselves are often stowed in pieces below decks and assembled by hand, usually on deck, since their large size prevents assembly elsewhere. This assembly can involve not only the physical attachment of several wing panels, tailplane, struts, and other components, but many electrical, RF, and fuel connections required for flight. This evolution can take a few minutes for systems like the Dragon Eye, or several hours for systems like the Pioneer.

U.S. Pat. No. 6,601,795 to Chen discloses an air vehicle with scissor-type wings rotatably mounted on either side of the fuselage. U.S. Pat. No. 7,665,688 to Cylinder et al. discloses a convertible air vehicle with contra rotating wings rotatably mounted on the same side of a fuselage. U.S. Pat. No. 6,959,895 to Cylinder et al. discloses an air vehicle having two pivotably mounted wing pairs.

BRIEF SUMMARY

An air vehicle can be folded into or unfolded from a compact tubular storage container without assembly or disassembly of the air vehicle. The air vehicle includes a fuselage, two aerodynamic surfaces rotatably mounted on the fuselage along a common axis with at least one pivot mechanism, and at least one spring mechanism configured to deploy the aerodynamic surfaces so they extend outwardly from the body. In a stowed configuration, both aerodynamic surfaces are parallel to the fuselage for stowage of the aircraft in a container. Each aerodynamic surface has a winglet located at an outer edge of the tail portion of the aerodynamic surface, and a rudder on each winglet. The aircraft does not require a vertical stabilizer or rudder system on the fuselage. An outer backward-swept wing portion can be unfolded from the outer edge of each aerodynamic surface to increase the wing aspect ratio.

Another aspect is directed to an air vehicle with a fuselage, two aerodynamic surfaces, and means for pushing the aerodynamic surfaces into a deployed configuration in which the aerodynamic surfaces extend laterally from the body. Both aerodynamic surfaces are rotatably mounted on the fuselage along a common axis with at least one pivot mechanism. In a stowed configuration, both aerodynamic surfaces are parallel to the fuselage for stowage of the aircraft in a container.

Additional features will be apparent from the following drawings and detailed description of embodiments of the invention.

BRIEF DESCRIPTION OF THE DRAWINGS

FIG. 1A is an isometric view of an aircraft in a folded and stowed configuration.

FIG. 1B is a side view of the aircraft shown in FIG. 1A as stowed in a storage container.

FIG. 1C is a top view of the aircraft shown in FIG. 1A as stowed in a storage container.

FIG. 1D is a front view of the aircraft shown in FIG. 1A as stowed in a storage container.

DETAILED DESCRIPTION OF EMBODIMENTS OF THE INVENTION

Figure 2:
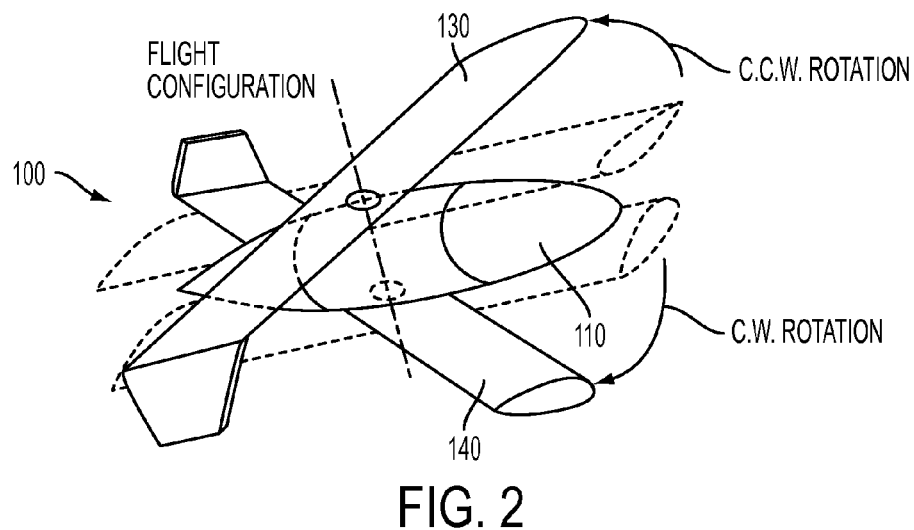
FIG. 2 illustrates the rotation of the aircraft wings as the aircraft is being deployed from its stored configuration to an initially deployed configuration.

Embodiments of the invention are directed to an aircraft that can be folded or unfolded from a compact tubular storage container. The aircraft can be manually inserted and removed from the container, or it can be equipped to self-launch and automatically deploy its aerodynamic surfaces mid-air, after clearing the confines of the container. The aircraft can also include mechanisms for holding spring-loaded aerodynamic surfaces closed during storage within the container, or the aircraft can be constrained in its stowed configuration by the container itself.

FIG. 1A illustrates an aircraft 100 in its stowed configuration within a tubular container 120. The aircraft includes a fuselage or body 110, and two aerodynamic surfaces 130 and 140, also described herein as "wings" or "airfoils".

FIG. 1B shows a side view of the stowed aircraft, FIG. 1C shows a top view of the stowed aircraft, and FIG. 1D shows the front view of the stowed aircraft.

The nose 112 of the aircraft body 110 faces in the direction of flight 160.

When stowed, the aerodynamic surfaces 130 and 140 lie parallel to the body 110, with one on one side of the body and one on an opposite side of the body. The aerodynamic surfaces are each rotationally attached to the body 110 along a main pivot axis 150 that is perpendicular to the longitudinal axis 170 of the body 110. As shown in FIG. 1A, the leading edges 131 and 141 of the aerodynamic surfaces 130 and 140 face in opposite lateral directions when stowed.

FIG. 2 shows the aircraft 100 as it is being deployed from the stowed position shown in FIGS. 1A-1D. To deploy from the stowed position, one of the aerodynamic surfaces 130 rotates in the counterclockwise direction and the other of the aerodynamic surfaces 140 rotates in the clockwise direction around the main pivot axis 150, which is approximately vertical when the aircraft is in a horizontal flight position.

Figure 3A:
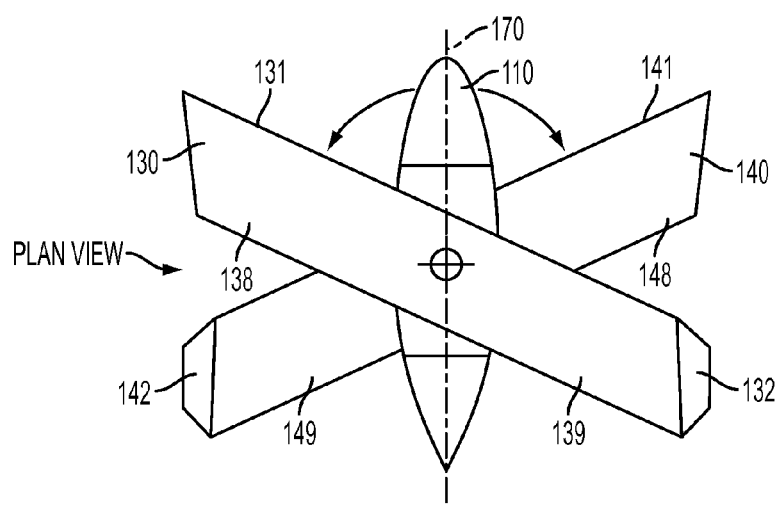
FIG. 3A is a top view of the aircraft as it as the aircraft is being deployed from its stored configuration to an initially deployed configuration.
Figure 3B:
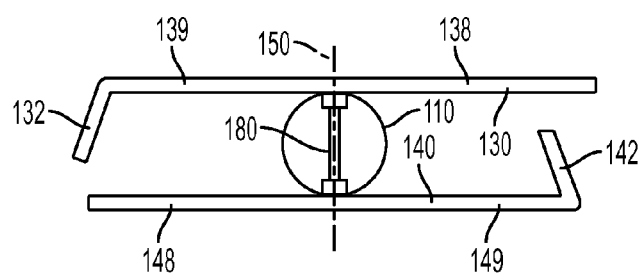
FIG. 3B is a front view of the aircraft as it as the aircraft is being deployed from its stored configuration to an initially deployed configuration.

The pair of aerodynamic surfaces 130 and 140 forms a X shape when viewed from the top (plan view) of FIG. 3A. The leading edges 131 and 141 of the aerodynamic surfaces 130 and 140 each face toward the direction of motion when the aerodynamic surface have been rotated into their deployed configuration. FIG. 3B shows the front view of the aircraft 100 in its initial flight configuration.

In an exemplary embodiment, the aircraft includes a pivoting mechanism 180 for rotating the aerodynamic surfaces 130, 140 into their deployed position. The pivoting mechanism 180 pre-loaded torsion spring with the aerodynamic surfaces attached to opposite ends of the torsion spring. The torsion spring will push the aerodynamic surfaces 130, 140 to automatically scissor to the open (flight) position until halted by mechanical stops built into either the pivoting mechanism or the aircraft fuselage 110. When the aerodynamic surfaces 130, 140 are folded to their stowed positions parallel to the fuselage, the torsion spring pivot tightens and the surfaces 130, 140 are held in their stowed position by either electromechanical latches or the confines of the storage container. Other pivoting devices are also suitable.

Note that each aerodynamic surface has a forward portion, which is ahead of the pivot axis 150 in the direction of motion. For example, aerodynamic surface 130 has a forward portion 138 and a rear portion 139, and aerodynamic surface 140 has a forward portion 148 and a rear or tail portion 149. The forward portions of each aerodynamic surface outboard of the fuselage can be considered to function as wings, and the rear portions of each aerodynamic surface outboard of the fuselage can be considered to function as the tail portions of the aircraft.

As seen in FIG. 3B, the fuselage or body 110 provides vertical separation between the aerodynamic surfaces. For example, the main body of the aerodynamic surface 130 is vertically above the main body of the aerodynamic surface 140 when in horizontal flight mode. This allows each tail portion to be vertically separated from its adjacent wing portion. For example, the tail portion 149 is vertically below the adjacent wing portion 138 (as seen at the left in FIG. 3A and at the right in FIG. 3B), and the tail portion 139 is vertically above the adjacent wing portion 148 (as seen at the right in FIG. 3A and on the left in FIG. 3B). This vertical separation between adjacent wing and tail portions enhances flight performance, stability, and control.

Figure 4A:
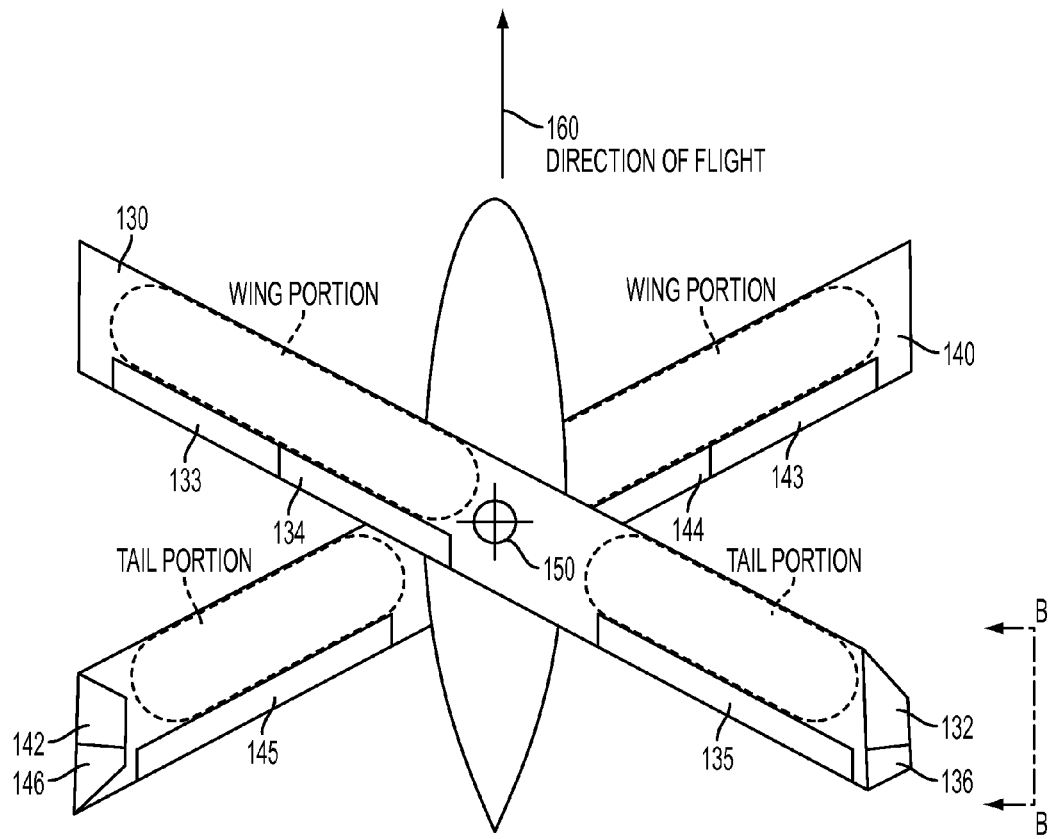
FIG. 4A is a top plan view of the aircraft in an initially deployed configuration in more detail.
Figure 4B:
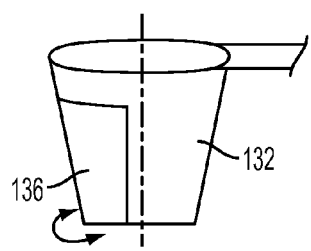
FIG. 4B illustrates the end portion of the aerodynamic surface of the aircraft of FIG. 4A.

FIG. 4A illustrates the aircraft 100 in greater detail. FIG. 4B illustrates the outer edge portion of the rear part of the aerodynamic surface. The trailing edges of the forward portions of the aerodynamic surfaces can be equipped with ailerons 133, 143 for lateral control and/or flaps 134, 144 for increasing lift and drag. The rear portion of each aerodynamic surface is the portion that is behind the pivot axis 150. These rear portions function as the aircraft's horizontal tail.

The tail portions of the aerodynamic surfaces can be equipped with elevators and/or elevons 135, 145, with elevators providing for longitudinal control and the elevons providing combined lateral and longitudinal control.

A winglet 132, 142 is located at the outboard end of each of the aerodynamic surfaces 130, 140. The winglets are intended to provide directional stability. Each of the winglets can be equipped with a rudder for yaw control. For example, winglet 132 in FIG. 4B includes a rudder 136 that has an approximately vertical axis of rotation. No other vertical stabilizer is necessary for the aircraft flight.

Note that the winglets 132, 142 can be slightly canted in opposite directions, as visible in FIG. 3B and FIG. 1B, in order to clear each other when the aerodynamic surfaces are stowed. As seen in FIG. 1A, when stowed the aerodynamic surfaces 130, 140 are aligned with the winglets at the same tail end of the fuselage 110.

Figure 5:
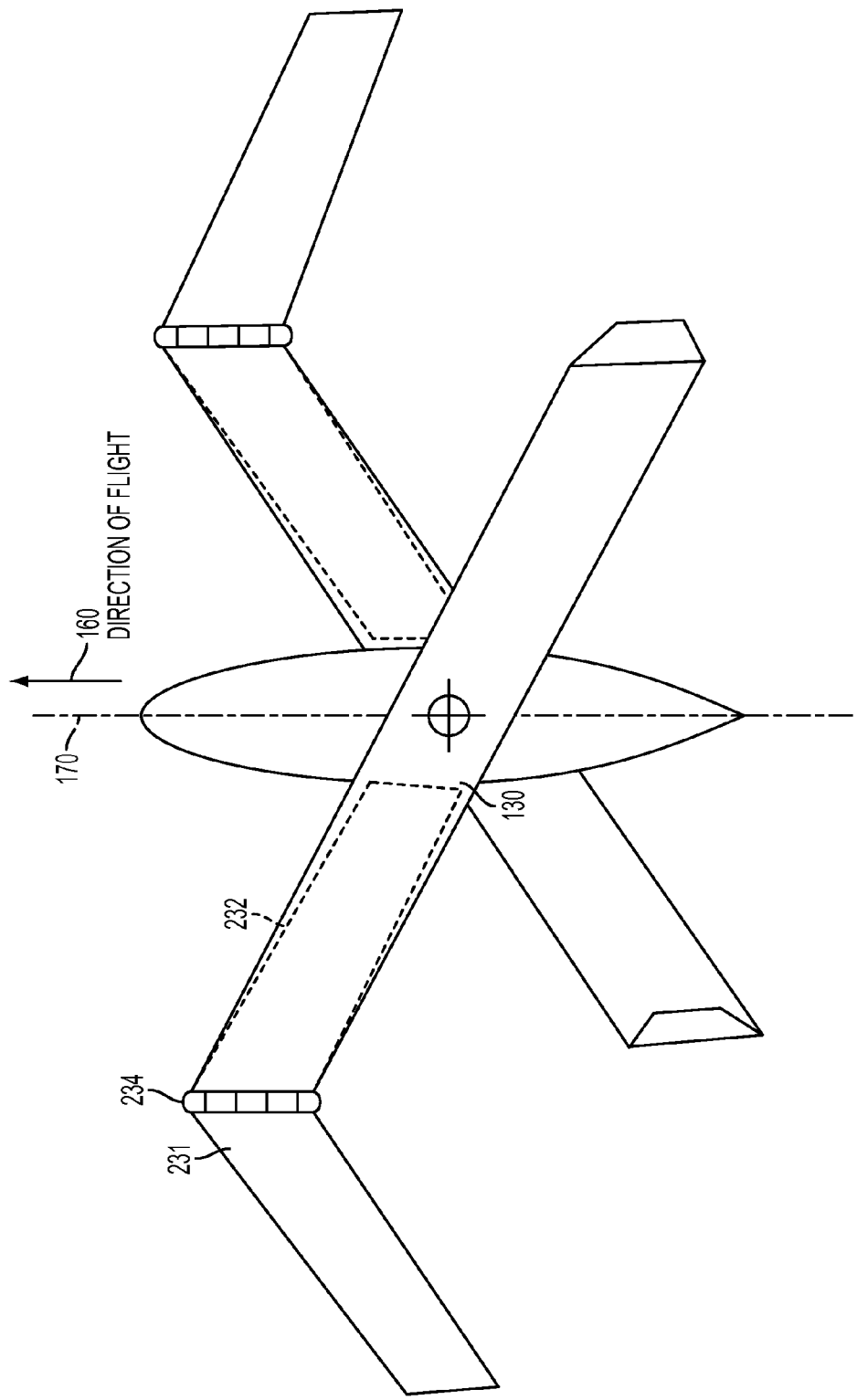
FIG. 5 is a top plan view of the aircraft of FIG. 4A as the wing is unfolded.

In an exemplary embodiment, each of the aerodynamic surfaces 130, 140 of the aircraft 100 can also include an outer wing panel that is hinged to the outer edge of the forward part of the aerodynamic surface. As shown in FIG. 5, the outer wing panel 231 is deployed by folding it outward from its stowed position below the aerodynamic surface 130.

The outer wing panels can be deployed for low speed flight. Deployment of the outer wing panels significantly increases both the wingspan and the aspect ratio of the aircraft, thereby enhancing low speed flight performance. This provides an efficient aerodynamic shape for improved lift/drag ratio at high lift coefficients.

The length of each of the outer wing panels should be less than the distance from the body 110 to the hinge, in order for the outer wing portions to clear the body when unfolded or folded.

The outer wing panel's stowed position under the forward part of the aerodynamic surface is shown as a dotted line 232. In the stowed position, the outer wing panels are held tightly against the aerodynamic surfaces. The stowed position is useful for high speed flight.

The outer wing panels are locked in their stowed positions and in their deployed positions with electronically controlled latches. The outer wing panels deploy and retract using the aerodynamic forces from forward motion of the aircraft, and or with commanded flight maneuvers.

As seen in FIG. 5, the forward portion of the aerodynamic surface inboard of the hinge 234 extends outward and forward in the direction of flight 160. The outer wing panel 231 outboard of the hinge 234 is swept backward. As shown in FIG. 5, the hinge 234 axis is approximately parallel with the longitudinal axis 170 of the fuselage, which is approximately aligned with the direction of flight 160.

Figure 6:
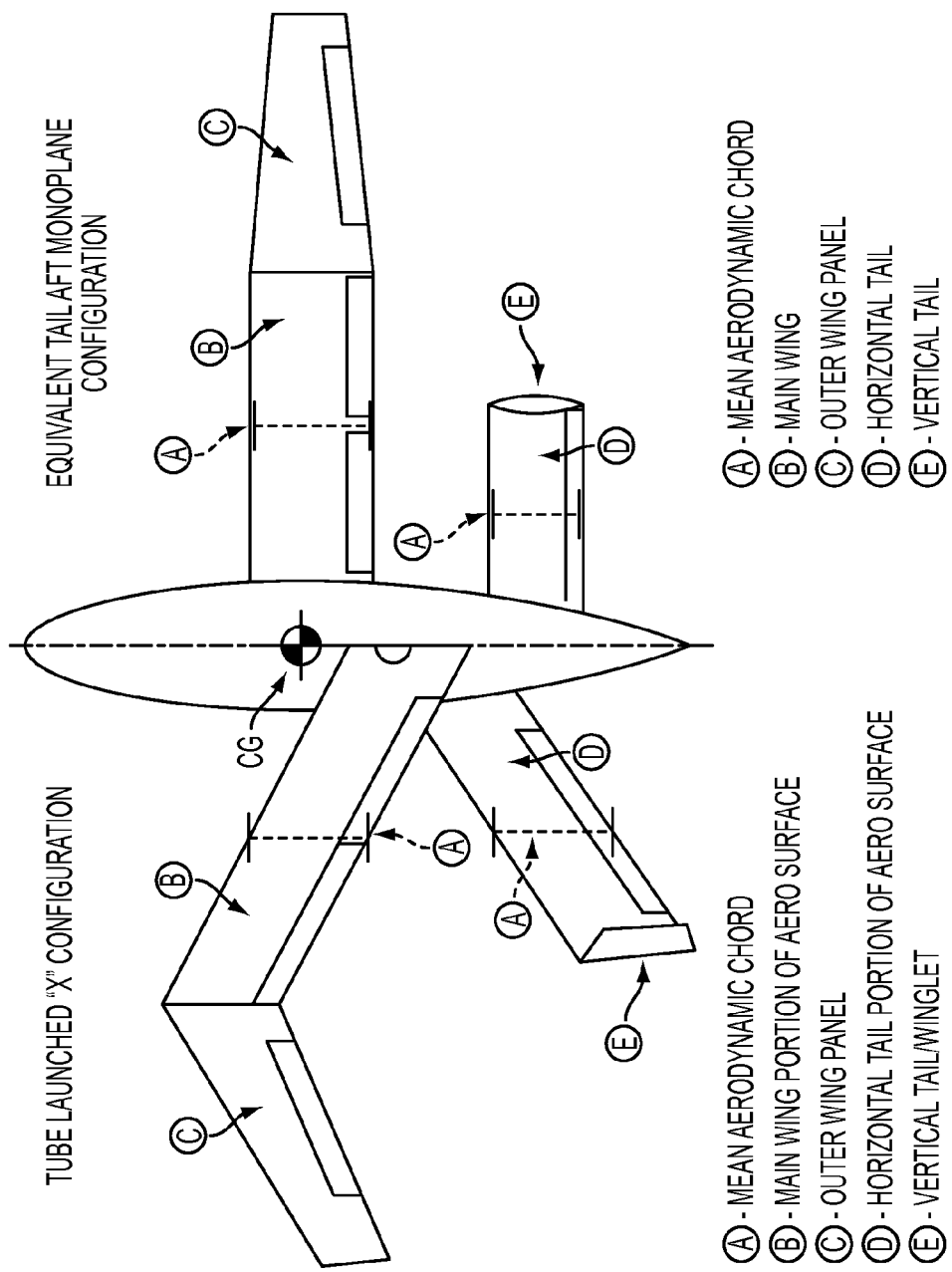
FIG. 6 is a composite illustration relating the functions of the aerodynamic surfaces to those of a traditional aircraft.

FIG. 6 is an illustration showing the equivalent functions of the tube-launched X configuration aircraft compared to a traditional airplane. The two aerodynamic surfaces perform all the functions of the wing, horizontal tail, and vertical tail surfaces of a high performance, tail-aft monoplane configuration aircraft. As a result, no vertical stabilizer or rudder is needed on the body 110 of the aircraft 100.

The degree of wing sweep angle can be determined through engineering selection based on the performance requirements. Smaller sweep angles (closer to being orthogonal with the side of the body) increase the low speed aerodynamic efficiency but reduce high speed efficiency, and reduce the stability and control at all speeds. Larger sweep angles increase the high speed aerodynamic efficiency but reduce low speed efficiency, and increase the stability and control at all speeds. The wing sweep angle for the aerodynamic surfaces 130 and 140 can be between about 20 degrees and about 30 degrees, optimally about 25 degrees for low speed flight. For higher speed flight, the angle can be up to about 60 degrees. The X configuration can improve transonic aerodynamic performance by minimizing wave drag at transonic speeds with an advantageous cross sectional area rule.

Referring again to FIG. 1A, the completely assembled aircraft can be completely stowed within a tubular storage container without the need to remove components before stowing. The storage container can also function as a launcher, with an included launch mechanism, such as a rocket booster.

The aircraft can be a manned or an unmanned aircraft, as the configuration is suitable for any operational scenario in which storage and/or launch from a tubular container are desirable.

The aircraft 110 can also include a propulsion system. For example, propellers can be located at the front of the body 110, the rear of the body 110, or at both ends. Rocket, jet propulsion, or other propulsion systems may also be integrated into the aft end of the body.

The aircraft can be carried in its stowed configuration within the storage container on a ship's deck, which eases storage concerns and allows rapid launch. The aircraft is not limited to shipboard transportation and use, and can be operated from any suitable launch environment.

The storage container can have a circular, square, rectangular, or hexagonal cross section, or another shape. The storage container preferably has smooth interior surfaces to allow the aircraft to readily be slid or rolled into the container.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. An air vehicle comprising:
    a fuselage;
    two aerodynamic surfaces, each aerodynamic surface having a first free end and a second free end and a central common pivot axis between the first and second free ends;
    wherein both aerodynamic surfaces are rotatably mounted on opposite sides of the fuselage along the common pivot axis with at least one pivot mechanism, wherein in a stowed configuration, both aerodynamic surfaces are parallel to the fuselage for stowage of the aircraft in a container;
    means for pushing the aerodynamic surfaces into a final deployed X-shaped configuration in which the aerodynamic surfaces extend laterally from the fuselage in a swept forward position with each aerodynamic surface having the first free end positioned forward of the pivot axis and the second free end positioned aft of the pivot axis,
    wherein the aircraft has no vertical stabilizer or rudder system on the fuselage,
    wherein each of the aerodynamic surfaces includes a winglet, and wherein the winglets are canted in opposite directions, such that the winglets do not contact each other in the stowed configuration.

2. An air vehicle comprising:
    a fuselage;
    two aerodynamic surfaces;
    wherein both aerodynamic surfaces are rotatably mounted on the fuselage along a common axis with at least one pivot mechanism, wherein in a stowed configuration, both aerodynamic surfaces are parallel to the fuselage for stowage of the aircraft in a container;
    means for pushing the aerodynamic surfaces into a deployed configuration in which the aerodynamic surfaces extend laterally from the body, wherein the means for pushing the aerodynamic surfaces includes a torsion spring,
    wherein each of the aerodynamic surfaces includes a winglet, and wherein the winglets are canted in opposite directions, such that the winglets do not contact each other in the stowed configuration.

3. The air vehicle according to claim 1, wherein each winglet includes a rudder.

4. The air vehicle according to claim 3, wherein the winglets and rudders on the aerodynamic surfaces are the only vertical stabilizers on the aircraft.

5. The air vehicle according to claim 1, further comprising:
    two outer wing portions, each outer wing portion being hingedly attached to an outer edge of one of the aerodynamic surfaces.

6. The air vehicle according to claim 5, wherein the outer wing portions are swept backward, providing structural bending relief to the aerodynamic surfaces and improving aerodynamic performance.

7. The air vehicle according to claim 1, further comprising:
    at least one aileron or one flap on a forward wing portion of each aerodynamic surface.

8. The air vehicle according to claim 1, further comprising:
    at least one elevator or elevon on the tail portion of each aerodynamic surface.

9. The air vehicle according to claim 1, further comprising:
    a propulsion system.

10. The air vehicle according to claim 9, wherein the propulsion system includes a fuel cell propulsion system.

11. The air vehicle according to claim 1, wherein both aerodynamic surfaces have a wing sweep angle of between 20 and 60 degrees in the final deployed X-shaped configuration.

12. The air vehicle according to claim 1, wherein both aerodynamic surfaces have a wing sweep angle of between 20 and 30 degrees in the final deployed X-shaped configuration.

13. The air vehicle according to claim 1, wherein the means for pushing the aerodynamic surfaces includes a torsion spring.

* * * * *